United States Patent [19]

Shiner

[11] Patent Number: 4,995,168

[45] Date of Patent: Feb. 26, 1991

[54] TECHNIQUE FOR LOCATING SUBMERGED AND BURIED PIPELINES

[76] Inventor: James A. Shiner, 6926 Aswan, Corpus Christi, Tex. 78412

[21] Appl. No.: 390,385

[22] Filed: Aug. 7, 1989

[51] Int. Cl.$^5$ ............................................. G01B 5/20
[52] U.S. Cl. ......................................... 33/529; 37/78; 37/72; 116/209
[58] Field of Search ...................... 33/1 H, 529, 561.1; 116/209; 37/61, 62, 63, 78, 72, 75, 76; 405/154, 158, 173, 170, 171; 166/352

[56] References Cited

U.S. PATENT DOCUMENTS

| | | | |
|---|---|---|---|
| 1,610,372 | 12/1926 | Hansen | 175/6 |
| 2,238,072 | 4/1941 | Nelson et al. | 405/173 |
| 2,635,855 | 4/1953 | Gunning | 173/52 |
| 2,852,868 | 9/1958 | Talbott et al. | 37/78 |
| 3,019,535 | 2/1962 | Talbott et al. | 37/78 |
| 3,027,951 | 4/1962 | Knapp et al. | 324/200 |
| 3,295,231 | 1/1967 | Talbott | 37/78 |
| 3,534,605 | 10/1970 | DeKoning | 73/290 R |
| 3,653,050 | 3/1972 | Eggleston, Jr. | 342/458 |
| 4,033,056 | 7/1977 | Demmers | 405/201 |
| 4,283,681 | 8/1981 | Kazuomi et al. | 324/326 |
| 4,480,942 | 11/1984 | Farrow | 405/154 |
| 4,574,241 | 3/1986 | Stelly | 324/326 |
| 4,596,493 | 6/1986 | Tisdale et al. | 37/63 |

FOREIGN PATENT DOCUMENTS 0181819 7/1988 Japan .................................. 405/154

Primary Examiner—Thomas B. Will
Attorney, Agent, or Firm—G. Turner Moller

[57] ABSTRACT

Apparatus for locating submerged buried pipelines includes a barge having a template providing a multiplicity of probes lowerable into the sea floor to contact the pipeline. A trench is excavated perpendicular to the pipeline by injecting air and/or water through the probe. Each of the probes includes an enlarged foot preferably longer in a dimension perpendicular to the pipeline than parallel to it.

13 Claims, 1 Drawing Sheet

TECHNIQUE FOR LOCATING SUBMERGED AND BURIED PIPELINES

This invention relates to a technique for locating and surveying pipelines which are buried below the floor of a body of water.

It occasionally occurs that the exact location and depth of a submerged buried pipeline must be determined. Many difficult problems occur when the pipeline is buried below the sea floor or sea bed, which phrases are used herein to designate the bottom of a body of water regardless of whether the water is fresh or saline, or whether the body is a sea, ocean, bay, lake, river, channel, canal, estuary, lagoon or the like. Locating submerged buried pipelines with conventional nonintrusive techniques, e.g. magnetic or electronic surveys, leaves a substantial uncertainty about the accuracy of the results and a gnawing worry that the results are grossly inaccurate. Conventional techniques involving dredging a ditch perpendicular to the pipelines and using divers to tag the pipeline is very expensive.

In one situation, several large diameter actively used high pressure oil, gas and product pipelines of various diameter extend in a 100' wide alley across a ship channel that is to be deepened to 45'. Although construction records show the pipelines to be buried below 52', an electronic survey of the crossing shows the pipelines to be substantially shallower-shallow enough to interfere with a dredging operation to 45'. Bids were taken to dredge a shallow trench across the 100' wide alley and use divers to tag the pipelines with a measuring instrument extending upwardly out of the water. The dredging technique had to be a low energy approach to avoid damage to the high pressure pipelines and pipeline coatings. The lowest bid was $380,000. Looking at the cost per yard of dredged material, the bid was $110/yard. This compares to $1.10–$5/yard in normal dredging operations, depending on the quantity of material involved. By any standards, the cost was exorbitant. The technique of this invention was used and determined to everyone's satisfaction that the pipelines were buried below 52' at a price of $220,000, to the benefit of all concerned. Subsequent operations in accordance with this invention are anticipated to be substantially less expensive because the equipment and a good bit of education has been paid for.

A technique known in the prior art to locate and survey pipelines buried below the sea floor is found in U.S. Pat. No. 4,574,241 where a dolly is mounted for movement on a barge in a path perpendicular to the pipeline. A probe is advanced downwardly from the dolly into the sea floor to a predetermined depth in an attempt to contact the pipeline. If it engages the pipeline, the depth of the probe and its horizontal location are surveyed with conventional instruments. If the probe misses the pipeline, the dolly is moved a short distance perpendicular to the pipeline and again lowered. This known approach has several substantial disadvantages: (1) there is some danger of damage to the pipeline or to the pipeline coating when the probe contacts it; and (2) the probe must be driven into the sea floor at surprisingly close intervals to overcome the uncertainties in positioning the probe thereby requiring an inordinate number of passes with the probe.

Other disclosures relating to this invention are found in U.S Pat. Nos. 1,610,372; 2,635,855; 3,534,605 and 3,653,050.

In accordance with this invention, a template is affixed to a work station, either along one side of a large marine barge or through a central work slot. The template includes a series of vertical conduits or guides mounting a multiplicity of probes for vertical movement through the water into the sea floor. The probes each comprise a conduit through which air or water is injected to excavate a hole in the sea floor below the probe. The bottom of each probe comprises a foot of substantially greater cross-sectional area than the probe. The foot is preferably substantially longer perpendicular to the pipelines. Thus, a cross member perpendicular to the probe is a preferred shape for the probe foot of this invention. Several advantages of a large cross-sectional area foot accrue: (1) because of a larger surface area, the risk of damage to the pipeline or pipeline coating is substantially reduced; (2) the probes can be spaced far apart enough to allow a plurality of probes to be used thereby eliminating components of the prior art and allowing all of the probes to be lowered to the design depth and remain there to be assured that the entire pipeline alley is crossed, without gaps.

In summary, this invention comprises apparatus for locating pipelines buried under the sea floor, comprising a barge having a template thereon including a multiplicity of vertical guides providing laterally spaced vertical axes extending into the water, a multiplicity of probe conduits received in the guides and constrained for vertical movement therein and having a foot on a lower end of the probe conduit of substantially larger cross-sectional size than the probe conduit and of substantially larger cross-sectional size than the guide and means connected to the probe conduits for raising and lowering the probe conduits to penetrate the floor to locate the buried pipeline by physical contact with the buried pipeline.

It is an object of this invention to provide an improved marine surveying technique for locating and surveying submerged pipelines.

A further object of this invention is to provide a marine surveying technique for locating submerged pipelines by using a multiplicity of footed probe conduits lowered sequentially into the bottom.

These and other objects of this invention will become more fully apparent as this description proceeds, reference being made to the accompanying drawing and appended claims.

Figure 1:
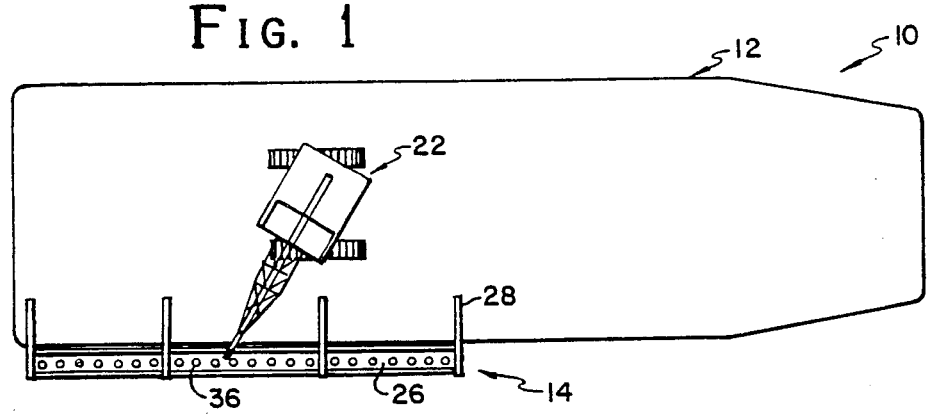
FIG. 1 is a top view of a barge, crane and template of this invention.
Figure 2:
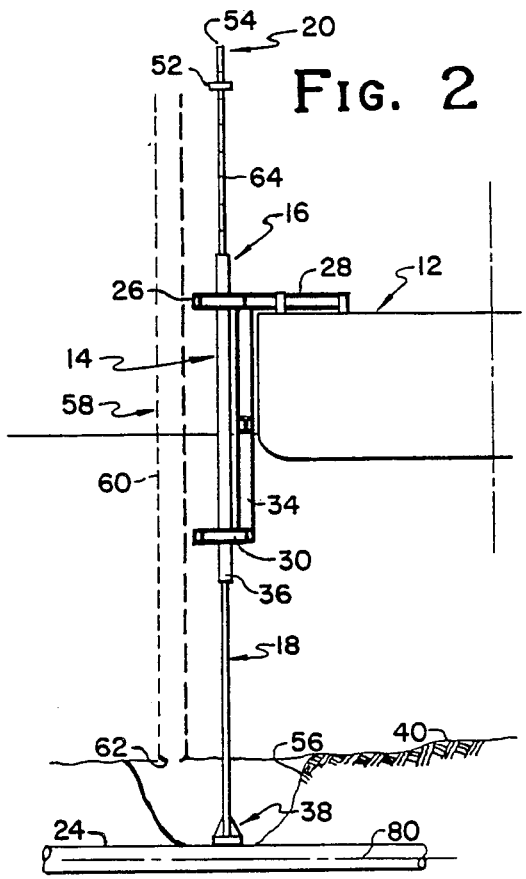
FIG. 2 is and end view of FIG. 1, illustrating a probe in a lowered position contacting a submerged buried pipeline.
Figure 3:
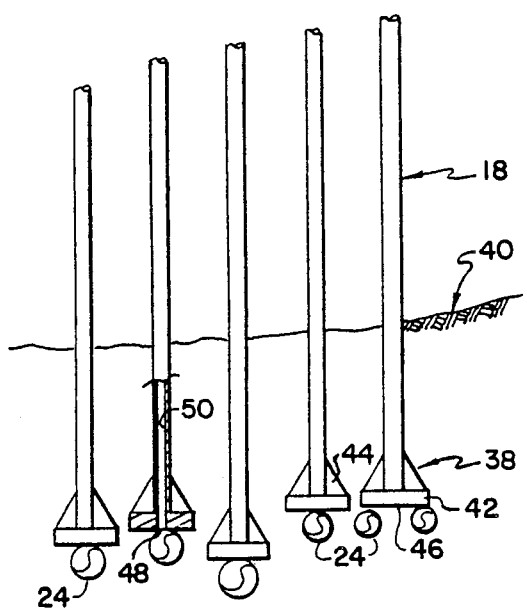
FIG. 3 is a partial stylized side view of the technique of this invention, illustrating the probes in a lowered position contacting a plurality of pipelines.

Referring to FIGS. 1–3, there is illustrated a marine surveying apparatus 10 of this invention comprising, as major components, a work barge 12, a template 14 having a multiplicity of vertical guides 16 and probes 18, means 20 for circulating air and/or water through or around the probes 18 and means 22 for raising and lowering the probes 18. Suitable surveying instruments (not shown) such as transits and the like may be on the shore or on the barge 12 for locating the position of the barge, reading a tide gauge distant from the barge and the like.

The barge 12 is a more-or-less conventional work barge on which the template 14 is mounted. Typically, the template 14 is mounted on one side of the barge for work over the side or mounted near the center of the barge for work through a central work slot. Typically, the general area of the pipeline or pipelines 24 is located by conventional surveying techniques, pipeline markers or the like. The barge 12 is towed or otherwise propelled to the site and its position more-or-less fixed by suitable spuds, anchors or the like (not shown) in a conventional manner in a direction generally perpendicular to the expected position of the pipeline 24.

The template 14 comprises an upper long beam 26 having a plurality of struts 28 secured to the barge 12 in any suitable manner so the template 14 can be easily installed and removed from the barge 12. A lower beam 30 is positioned below the upper beam 26. The beams 26, 30 are connected together by a plurality of structural members 34 and vertical conduits 36 which comprise the guides 16. The template 14 thus provides a linear series of vertical conduits 36 for guiding the probes 18 toward and away from the pipelines 24.

The probes 18 each comprise a conduit slightly smaller in diameter than the vertical conduits 36. Because the guide conduits 36 are quite long, eight feet long in the template used, there is very little potential deviation of the probes 18 from the vertical. As shown best in FIGS. 1 and 3, the guide conduits 36 are spaced apart a distance sufficient to allow them to be manipulated and worked around without running into the adjacent conduit 36 or probe 18. The probes 18 are thus free to move in a vertical direction through the guide conduits 36 and are held in an upper or retracted position in any suitable fashion, as by the use of a removable clamp (not shown) on the exterior of the probe 18 supported on the upper end of the guide conduits 36.

Attached to the bottom of each of the probes 18 is a foot 38 substantially larger in cross-section than the probe 18. Although the feet 38 may be of any suitable shape, they are preferably much longer perpendicular to the pipelines 24 than parallel to them to minimize the amount of material that must be excavated from the sea floor 40. The feet 38 thus preferably comprise a crosspiece 42 affixed to the probe 18 with suitable gussets 44 or other suitable reinforcing members. The bottom of the feet 38 includes a wooden, plastic, rubber or other relatively soft member 46, such as a wooden plank or sill, to minimize damage to the pipelines 24 or the coatings thereof. A vertical passage 48 communicates between a passage 50 in the probe 18 and the underside of the foot 38 to deliver water and/or air injected through the probe 18 to a location below the feet 38.

The spacing between the probes 18 and the width of the probe feet 38 perpendicular to the pipelines 24 is selected to provide gaps between the adjacent feet 38 to be so small that no pipeline can extend between them. In one design, the probes 18 are placed on 2'6" centers and the feet 38 are 2'2" wide. This is very comfortable so long as one is looking for pipelines 8" or larger overall diameter including coatings.

The water/air circulating means 20 comprises a fitting 52 attached to the upper end of the probe 18 and a conduit 54 leading to a pump and/or air compressor (not shown) to deliver relatively high pressure water and/or air through the probe 18 and foot 38 to excavate a relatively narrow, relatively shallow trench 56 in the sea floor 40. In the alternative, air and water may be separately supplied to ditch the trench 56. In this technique, a supplemental washing arrangement 58 may be employed comprising a heavy walled conduit 60 suspended from a separate line of the raising and lowering means 22. The conduit 60 is connected to a water pump drawing water from over the side and delivering it through a nozzle 62 to dislodge the sediments on the sea floor 40. Air is then circulated down the probe 18 merely to assist sediment removal from the trench 56.

The raising and lowering means 22 may be any suitable hoist that can handle the load of one of the probes 18 and the supplemental washing arrangement 58. Typically, a small crane is quite acceptable.

Operation of the apparatus 10 of this invention should now be apparent. The barge 12 is located over the pipelines 24 in a path perpendicular to the expected direction of the pipelines and anchored. Preferably, one end of the template 14 is beyond the expected side of the pipelines 24. Starting at that end, each of the probes 18 is lowered, either alone or with the supplemental washing arrangement 58, to excavate the trench 56. The maximum amount of vertical travel of the probes 18 is determined before the operation begins. For example, in the situation mentioned previously, it was necessary to determine whether the pipelines 24 would interfere with dredging to 45' below sea level and if the pipelines were below 51', it did not matter where they were. Thus, the maximum probe movement was 52' below sea level. When this depth is reached, one of the pipelines 24 is contacted or it is not. This is easy to determine because air and/or water is delivered through the probe 18 while it is being lowered. If the probe 18 cannot be lowered further, something rigid has been contacted and the load line from the crane 22 goes slack. If a pipeline is contacted, the horizontal location of probe is determined by its position in the template 14 and the known location of the barge 12, the depth of the probe 18 is read off indicia 64 and a nearby tide gauge or benchmark (not shown) is read with a transit or the like to determine the vertical location of the probe foot 38. If no pipeline is contacted by the probe 18, it is known that the pipeline 24 is either deeper than the probe foot 38 or is horizontally spaced from the probe foot 38.

The probes 18 are sequentially lowered and preferably left down until all of the probes 18 have been lowered to contact a pipeline 24 or to their maximum depth. When all of the probes 18 have been lowered along a pipeline alley to the maximum predetermined depth, it is incontrovertible proof that the pipelines 24 are buried deeper than the probe feet 38.

Figure 4:
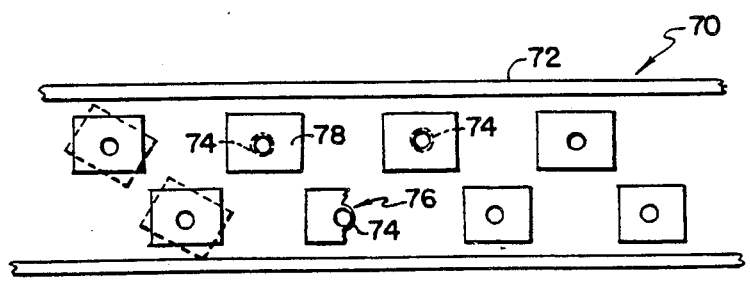
FIG. 4 is an enlarged partial bottom view of another embodiment of a template of this invention illustrating two alternative probe configurations.

Referring to FIG. 4, there is illustrated another embodiment of this invention comprising a template 70 having a lower beam 72 supporting a plurality of vertical guide conduits 74 receiving a probe 76 therein having a foot 78. Instead of the probes being in a single straight line, the probes 76 are arranged in two staggered rows. There are two major advantages. The rows may be spaced far enough apart in the pipeline axis direction that there is very little or no possibility of one of the probe feet 78 landing on an already lowered foot thereby giving a false ready that a pipeline has been contacted. In addition, the feet 78 may be made wider than the spacing between the centerlines of the probes 74, in a direction perpendicular to the pipeline axis 80, so there is no pipeline too small to be found by the template 70.

In the alternative, the feet 78 may be inclined to the axis of the beam 72 as shown in dashed lines on the left of FIG. 4.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A marine surveying device for locating pipelines buried under the floor of a body of water, comprising
   a barge having a template thereon including a multiplicity of vertical guides providing laterally spaced vertical axes extending into the water;
   each of the vertical guides having a probe conduit constrained for vertical movement thereby and having
   a foot on a lower end of each of the probe conduits of substantially larger cross-sectional size than the probe conduit and of substantially larger cross-sectional size than the guide;
   means for delivering a pressurized fluid through each of the probe conduits for washing out the floor; and
   means connected to the probe conduits for separately raising and lowering each of the probe conduits while delivering the pressurized fluid to penetrate the floor and locate the buried pipeline by physical contact between the probe conduit and the buried pipeline 2. The marine surveying device of claim 1 wherein the guides are linearly arranged along the template.

3. The marine surveying device of claim 2 wherein a first series of the guides extend along a first linear trace, a second series of the guides extend along a second linear trace parallel to and laterally spaced from the first linear trace, lines drawn from the guides of the second series through the adjacent guides of the first series intersecting the first and second linear traces at an acute angle thereby offsetting the guides of the second series from the guides of the first series.

4. The marine surveying device of claim 3 wherein the guides each comprise a conduit receiving a respective one of the probe conduits.

5. The marine surveying device of claim 3 wherein the first and second traces are generally perpendicular to the pipeline.

6. The marine surveying device of claim 1 wherein the cross-sectional area of the foot is on the order of at least ten times the cross-sectional area of the probe conduit.

7. The marine surveying device of claim 6 wherein the foot is longer in a direction perpendicular to the pipeline than in a direction parallel to the pipeline.

8. The marine surveying device of claim 7 wherein the foot comprises a member generally perpendicular to the vertical axis.

9. The marine surveying device of claim 8 wherein the probe connects to the foot at a central location of the foot.

10. The marine surveying device of claim 6 wherein the foot comprises a generally flat bottom formed from a relatively soft material such as wood, rubber or plastic.

11. The marine surveying device of claim 10 wherein the bottom provides an opening therethrough in communication with the probe conduit for delivering the pressurized fluid therethrough.

12. The marine surveying device of claim 1 wherein the foot comprises a generally flat bottom formed from a relatively soft material such as wood, rubber or plastic.

13. The marine surveying device of claim 12 wherein the bottom provides an opening therethrough in communication with the probe conduit for delivering the pressurized fluid therethrough.

* * * * *